United States Patent
Whittam et al.

(10) Patent No.: US 8,311,591 B2
(45) Date of Patent: Nov. 13, 2012

(54) CLOSED-LOOP EFFICIENCY MODULATION FOR USE IN NETWORK POWERED APPLICATIONS

(75) Inventors: Simon P. Whittam, Kanata (CA); John S. Gryba, Stittsville (CA); Michael W. Parrell, Stittsville (CA)

(73) Assignee: Alcatel Lucent, Paris (FR)

( * ) Notice: Subject to any disclaimer, the term of this patent is extended or adjusted under 35 U.S.C. 154(b) by 614 days.

(21) Appl. No.: 12/454,135

(22) Filed: May 13, 2009

(65) Prior Publication Data

US 2010/0291919 A1    Nov. 18, 2010

(51) Int. Cl.
   *H04B 1/38* (2006.01)
(52) U.S. Cl. ............... 455/572; 455/550.1; 455/403; 713/322
(58) Field of Classification Search ............ 455/572, 455/550.1, 403; 713/322
   See application file for complete search history.

(56) References Cited

U.S. PATENT DOCUMENTS

| 5,778,237 | A  | * | 7/1998  | Yamamoto et al. | 713/322 |
| 6,445,087 | B1 | * | 9/2002  | Wang et al.     | 307/40  |
| 8,044,535 | B2 | * | 10/2011 | Bleus           | 307/64  |
| 2003/0197705 | A1 | * | 10/2003 | Kawai et al.  | 345/505 |

* cited by examiner

*Primary Examiner* — Danh Le
(74) *Attorney, Agent, or Firm* — Hitt Gaines, PC

(57) ABSTRACT

A method and a remote device such as a sealed expansion module (SEM) for reducing power dissipation from an input power source in a telecommunications system are disclosed. A SEM contains a network feed monitor that receives an input voltage and current on twisted wire pair cables. The input voltage is then transmitted to a DC/DC converter and the voltage is adjusted and then transmitted to a BUS feed monitor connected to an active load. A first I2C device is connected to the network feed monitor to provide information related to input voltage and current to a main microprocessor that calculates input power. A second I2C device is connected to the BUS feed monitor and the active load to provide information related to the output voltage and output current to the main microprocessor that calculates output power. The main microprocessor is further connected through a third I2C device to a digital power manager that provides a DAC trim output to the DC/DC converter for optimizing the efficiency of the system.

15 Claims, 3 Drawing Sheets

US 8,311,591 B2

CLOSED-LOOP EFFICIENCY MODULATION FOR USE IN NETWORK POWERED APPLICATIONS

CROSS REFERENCE TO RELATED APPLICATIONS

This U.S. non-provisional patent application does not claim priority to any U.S. provisional patent application or any foreign patent application.

FIELD OF THE DISCLOSURE

The disclosures made herein relate generally to the telecommunications industry. The invention discussed herein is in the general classification of a method and a remote device such as a sealed expansion module (SEM) for reducing power dissipation from an input power source.

BACKGROUND

Network powered applications (e.g. +/−190 Vdc or +/−130 Vdc applications) are subject to voltage drop losses on the twisted wire pair cables (e.g. 22 AWG (American Wire Gauge)/24 AWG cables) that are typically used in telecommunications applications. The input power source is restricted to levels defined by the RFT-V (Remote powering Feeding Telecom-Voltage limited) specification. This restricts the input power source to maximum voltage, current and power levels (i.e. +/−190V (volts) +/−3%; 265 mA (milliamperes); and 100 VA (volt amperes or 100 watts), respectively) thus restricting the total available loop length for higher powered applications.

Bellcore GR-1089-CORE provides certain centralized coordination standards for the regional Bell operating companies and does not permit direct paralleling of multiple power sources over respective telecommunication wires to supply power in excess of 100 VA. Moreover, paralleling of multiple twisted wire pair cables on a single loop increases costs and reduces the number of available wires in a single three-hundred (300) wire bundle. Paralleling of multiple twisted wire pair cables onto a telecommunications wirewrap pin is also prohibited. In order to optimize the system efficiency using a limited input power source and with traditional losses associated with a finite loop impedance, any remote unit in the system must be as efficient as possible in order to meet or exceed loop-length requirements from the power source.

Currently, there is no existing solution to mitigate the voltage drop on the twisted wire pair cables other than using more expensive, larger gauge wire or multiple twisted wire pair cables. Therefore, a closed-loop efficiency modulation technique within a remote device is needed to optimize the power efficiency in the entire loop, thereby reducing the required input current and associated voltage drop from the power source. This will allow the remote units/devices (e.g. SEMs) of the system to be placed farther from the input power source and will reduce the power dissipation inside the remote unit. In addition, this will increase reliability and reduce global hydro requirements.

Several technical terms will be used throughout this application and merit a brief explanation. A sealed expansion module (SEM) is a sealed enclosure that can be mounted in a variety of locations and protects a myriad of electronics equipment. An SEM is often a compact, sealed, full-service Internet Protocol (IP) access node for remote deployments in a network and may offer multiple very high bit-rate digital subscriber line (VDSL) ports.

An integrated circuit (IC) is a miniaturized electronic circuit having both semiconductor devices and passive components. An IC is manufactured in the surface of a thin substrate of semiconductor material and used in virtually any piece of electronic equipment.

An inter-integrated circuit (I2C) is a multi-master serial computer bus. It has a bi-directional two-wire design that utilizes a serial data line (SDL) and a serial clock line (SCL). The I2C bus is controlled by a master device that tells various slave devices when they are permitted to access the bus. For example, a digital-to-analog converter (DAC) could be a slave device accessed via the master device.

A DAC is a device that converts a digital signal (e.g. a binary code) to an analog signal (e.g. current or voltage).

A DC to DC converter is an electronic circuit that converts a source of direct current from one voltage level to another. This is done because many electronic devices that are supplied with external power or internal battery power contain multiple circuits that require different voltage levels than supplied by the external power source or internal battery.

An opto-isolator is a device that uses a short optical transmission path to transfer a signal between elements of a circuit (e.g. a transmitter and a receiver) while keeping them electrically isolated.

A bus or BUS is a common voltage rail used to power multiple nets/nodes within a power circuit. A communication protocol device is a computer bus. For example, but not by way of limitation, a communication protocol device may include a 1-Wire bus, HyperTransport bus, I2C bus, PCI (Peripheral Component Interconnect) Express bus, SPI (Serial Peripheral Interface) bus, or SMBUS (System Management bus).

SUMMARY OF THE DISCLOSURE

The present invention provides a method and remote device such as a remote sealed expansion module (SEM) for reducing power dissipation in a telecommunications loop.

In the preferred embodiment of this invention, a SEM contains a network feed monitor that receives an input voltage and current on a pair of Ring/Tip pairs. The input voltage is then transmitted to a DC/DC converter and the voltage is adjusted and then transmitted to a BUS feed monitor connected to an active load. A first I2C device is connected to the network feed monitor to provide information related to input voltage and current to a main microprocessor that calculates input power. A second I2C device is connected to the BUS feed monitor and the active load to provide information related to the output voltage and output current to the main microprocessor that calculates output power. The main microprocessor is further connected through a third I2C device to a digital power manager that provides a DAC trim output to the DC/DC converter for optimizing the efficiency of the system.

In an alternative embodiment, the first I2C device and the second I2C device also transmit information related to temperature status in addition to current and voltage readings.

The preferred method of this invention involves utilizing a first I2C device to monitor an input voltage and input current to a remote unit; providing the input voltage and input current to a main microprocessor for calculating an input power; utilizing a second I2C device to monitor an output voltage and output current from the remote unit; providing the output voltage and output current to the main microprocessor for calculating an output power; calculating a power efficiency of the remote unit at the main microprocessor based on the input power and the output power; utilizing a third I2C device to provide the power efficiency of the remote unit to a digital power manager; and utilizing the digital power manager to control the DA trim output to a DC/DC converter.

An alternative method of this invention involves utilizing the first I2C device and the second I2C device to monitor temperature status in addition to current and voltage status.

Under some applications, embodiments of the invention may provide a method and remote device (e.g. a remote SEM) for reducing power dissipation in a telecommunications loop.

Under some applications, embodiments of the invention may produce higher power efficiency in a system utilizing an input power source and remote devices that dissipate power connected on a loop.

Under some applications, embodiments of the invention may provide a system that permits longer loop lengths in order to reach more customers due to the ability to consume less power in each remote device connected on the loop.

Under some applications, embodiments of the invention may provide an overall system that will have increased efficiency and thereby draw less power from an input power source.

Under some applications, embodiments of the invention may provide a "green power solution" to meet new global standards by consuming less energy on shorter length loops.

Under some applications, embodiments of the invention may provide a method that is relatively inexpensive to implement that reduces power dissipation from an input power source in a telecommunications system.

Under some applications, embodiments of the invention may provide a device that is relatively inexpensive to manufacture and deploy that reduces power dissipation from an input power source in a telecommunications system.

Under some applications, embodiments of the invention may provide a method and remote device that efficiently reduces power dissipation from an input power source in a telecommunications system.

Under some applications, embodiments of the invention may provide a reliable method and remote device for reducing power dissipation from an input power source in a telecommunications system.

DETAILED DESCRIPTION OF THE DRAWINGS

Figure 1:
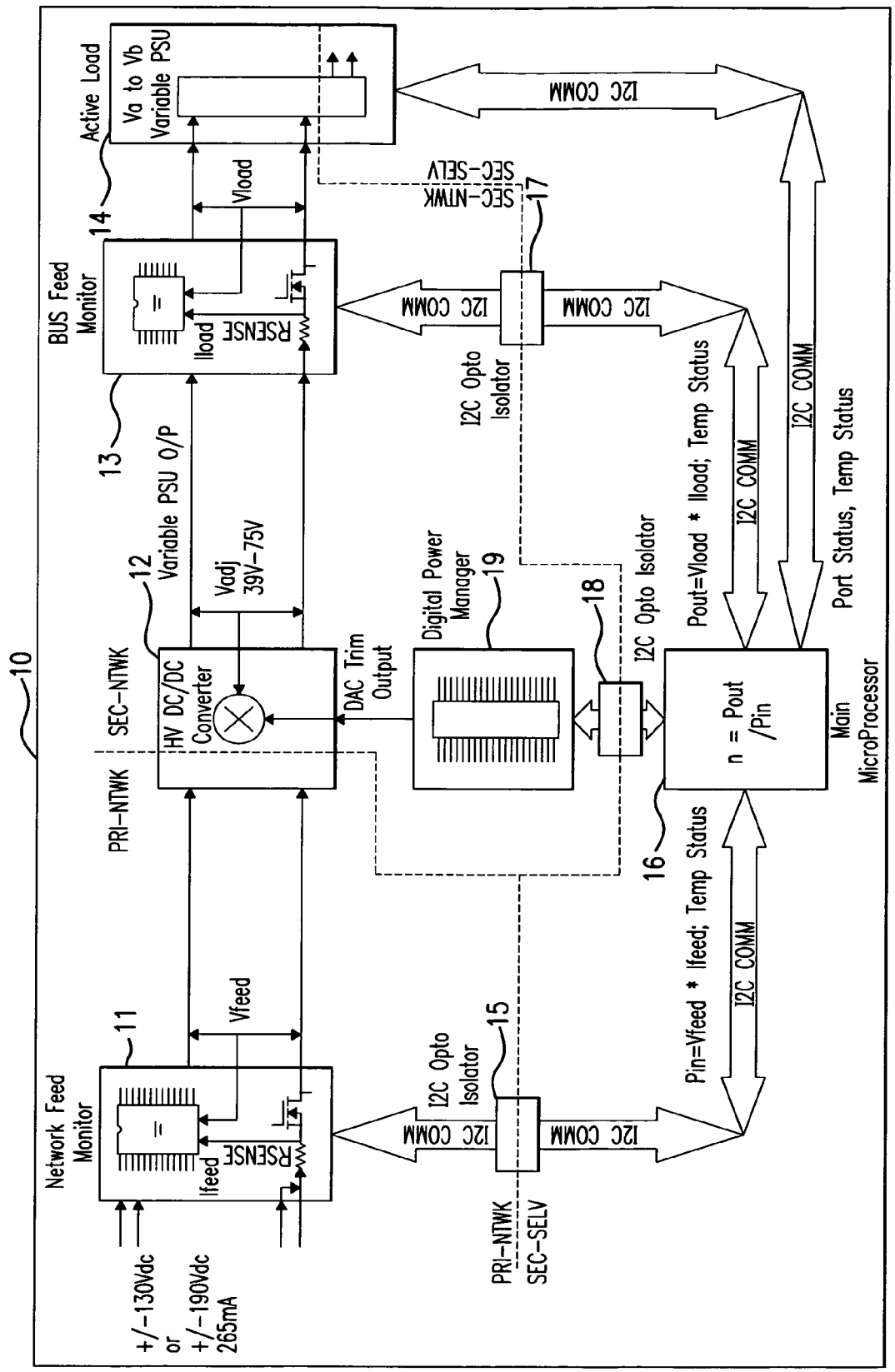
FIG. 1 depicts the preferred embodiment of the remote unit (SEM) utilizing an end-to-end efficiency modulation technique.

FIG. 1 depicts the preferred embodiment of the remote unit (SEM) utilizing an end-to-end efficiency modulation technique. In this preferred embodiment, a SEM 10 contains a network feed monitor 11 that receives an input voltage and current from an external power source along a pair of Ring/Tip pairs. Other wire/cabling arrangements are also possible for voltage and current transmission. The input voltage is then transmitted to a DC/DC converter 12 and the voltage is adjusted and then transmitted to a BUS feed monitor 13 connected to an active load 14. A first I2C device 15 is connected to the network feed monitor 11 to provide information related to input voltage and current to a main microprocessor 16 that calculates input power. A second I2C device 17 is connected to the BUS feed monitor 13 and the active load 14 to provide information related to the output voltage and output current to the main microprocessor 16 that calculates output power.

The main microprocessor 16 calculates a power efficiency utilizing the information supplied related to the input power and output power. The main microprocessor 16 is further connected through a third I2C device 18 to a digital power manager 19 that provides a DAC trim output to the DC/DC converter 12 for optimizing the efficiency of the system. Voltage trimming is a method of increasing the accuracy of a power supply through a correction signal that makes fine adjustments to the power supply's output voltage. In this preferred embodiment, I2C optocoupler isolation for all I2C devices is required to meet safety isolation needs.

The use of the preferred embodiment of the SEM 10 creates loop-length optimization in network powered applications. Power supply efficiency at the SEM 10 is a primary factor restricting the loop length available using a given input voltage source (e.g. 100 VA (W) source) through the impedances of and voltage drops associated with the telecommunication cabling. The efficiency of an input power supply can be attributed to conduction and switching losses. Conduction losses are predominantly based on current drawn through the switching devices and the series pass elements (such as inductors and sense resistors). Switching losses are predominantly based on switching device selection and voltage. By dynamically modulating the variable output voltage of the main DC/DC converter 11, these losses can be optimized by compromising one loss over the other. The overall efficiency range of the DC/DC converter 11 can be tabulated and the peak efficiency state defined for each operating condition (variable line, load and temperature, etc).

The overall efficiency of the system is monitored by the main microprocessor 16 and/or with the aid of a programmable logic device such as a Field-Programmable Gate Array (FPGA). Communication through I2C devices is discussed in conjunction with the preferred embodiment of the present invention; however, any other suitable communication protocol devices connected to the input device, the digital power manager and the output monitoring devices would be appropriate for use with the present invention. The input power and output power can be continuously calculated as the digital power manager 19 trims, through on-IC DAC, the output of the DC/DC converter 11 in order to optimize the overall system efficiency. As line and load conditions change, the system can react rapidly given a fixed algorithm to find the best efficiency setpoint for the new operating point.

For example, any time a condition changes related to line, load or temperature, the first I2C device 15 and second I2C device 17 communicate these changes in conditions to the main microprocessor 16. A power efficiency of the SEM 10 is then calculated using the current and voltage information provided from the input and the output under these new conditions. The power efficiency information is then sent to the digital power manager 19 which sends a DAC trim output signal to the DC/DC converter 11, causing the DC/DC converter 11 to make adjustments to its output voltage. After the various DC/DC converter output voltages are tested to determine the peak power efficiency for the SEM 10 under the new operating conditions, the digital power manager 19 ensures that the DC/DC converter 11 operates with the appropriate output voltage to obtain the peak power efficiency under these conditions until another change in conditions is detected.

By optimizing the efficiency, the system is capable of drawing less power from the input power source. In addition, the SEM 10 may be placed farther from the input power source. This is a major benefit for remote SEMs. It is estimated that efficiency modulation can establish a 3%-5% increase over the worst case efficiency specification of a fixed supply. This efficiency increase can create an increased loop length gain of 10%. For a 5000 feet application, this creates an increase of 500 feet thus allowing more customers for a single fixed location SEM. For a system dissipating 75 VA (W) in a 100 VA (W) limited application, the efficiency increase would only reduce the internal power dissipation by a few watts. If, however, thousands of these particular SEMs are installed, then the aggregate savings creates a substantial reduction in electrical power needs for the customer and thus reduces the overall power needs.

Remote users can port into the remote SEM and view real-time power consumption of the device. For example, a remote user could utilize a system connection to the main microprocessor of the SEM.

The system software can also use the readings from the system to record the power usage history, indicate warnings of power threshold crossings, report errors or faults on the power feed and power draw, record power statistics for fault analysis (black box analysis), and provide appropriate alarms or corrective action based on the power readings.

In FIG. 1, the Pin (power input)=Vfeed*Ifeed. The maximum power input represented by Pin(max) is equal to 100 VA or 100 W. The voltage of the input at the remote unit is represented by Vfeed wherein Vfeed=Vsource (voltage of the input source)−Vdrop (voltage drop over the cables which is a function of the impedance (Z) of the cables). The maximum current at the input is represented by Ifeed(max)=265 mA.

Pout (power output)=Vload*Iload wherein Vload is variable and between 39 V to 75V as dictated by the DAC trim output from the digital power manager.

The power efficiency of the system is computed through a simple equation stating that n (the power efficiency of system)=Pout/Pin.

In an alternative embodiment of the SEM, the various I2C devices also transmit information related to temperature status in addition to current and voltage readings.

Figure 2:
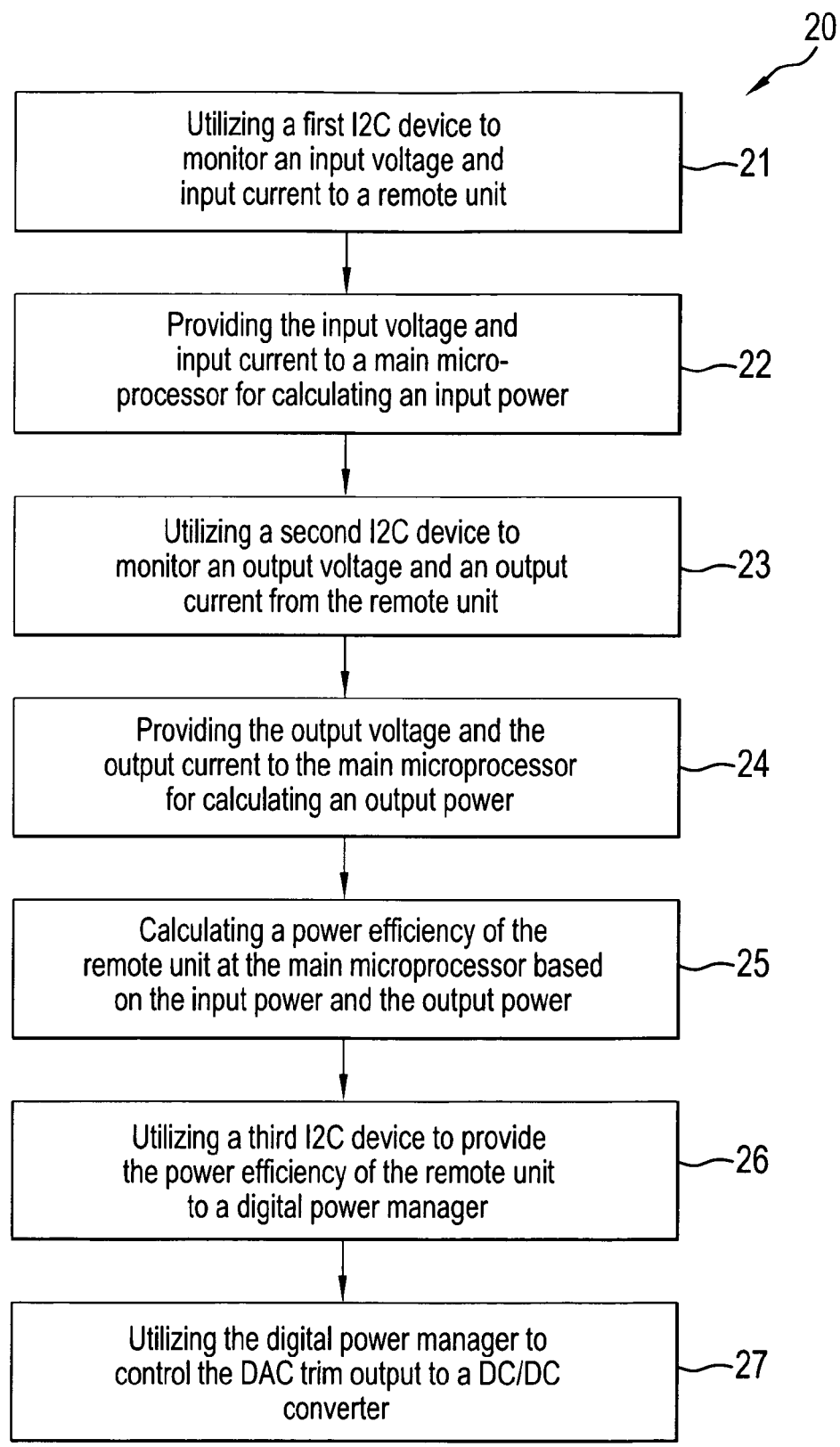
FIG. 2 depicts a method for providing end-to-end power efficiency in a remote unit (SEM).

FIG. 2 depicts a method for providing end-to-end power efficiency in a remote unit (SEM). The method of providing end-to-end efficiency in a remote unit 20 involves an operation 21 for utilizing a first I2C device to monitor an input voltage and input current to the remote unit. Operation 22 involves providing the input voltage and input current to a main microprocessor for calculating an input power. Operation 23 involves utilizing a second I2C device to monitor an output voltage and output current from the remote unit. Operation 24 involves providing the output voltage and the output current to the main microprocessor for calculating an output power. Operation 25 involves calculating a power efficiency of the remote unit at the main microprocessor based on the input power and the output power. Operation 26 involves utilizing a third I2C device to provide the power efficiency of the remote unit to a digital power manager. Operation 27 involves utilizing the digital power manager to control the DAC trim output to a DC/DC converter. The DAC trim output to the DC/DC converter allows various voltage outputs from the DC/DC converter to be tested to find the optimal one for creating the most power efficient remote unit given the current line and load conditions.

Alternative embodiments of the method involve utilizing the first I2C device to provide temperature measurements from the network feed monitor to the main microprocessor and utilizing the second I2C device to provide temperature information from the BUS feed monitor and active load to the main microprocessor.

Figure 3:
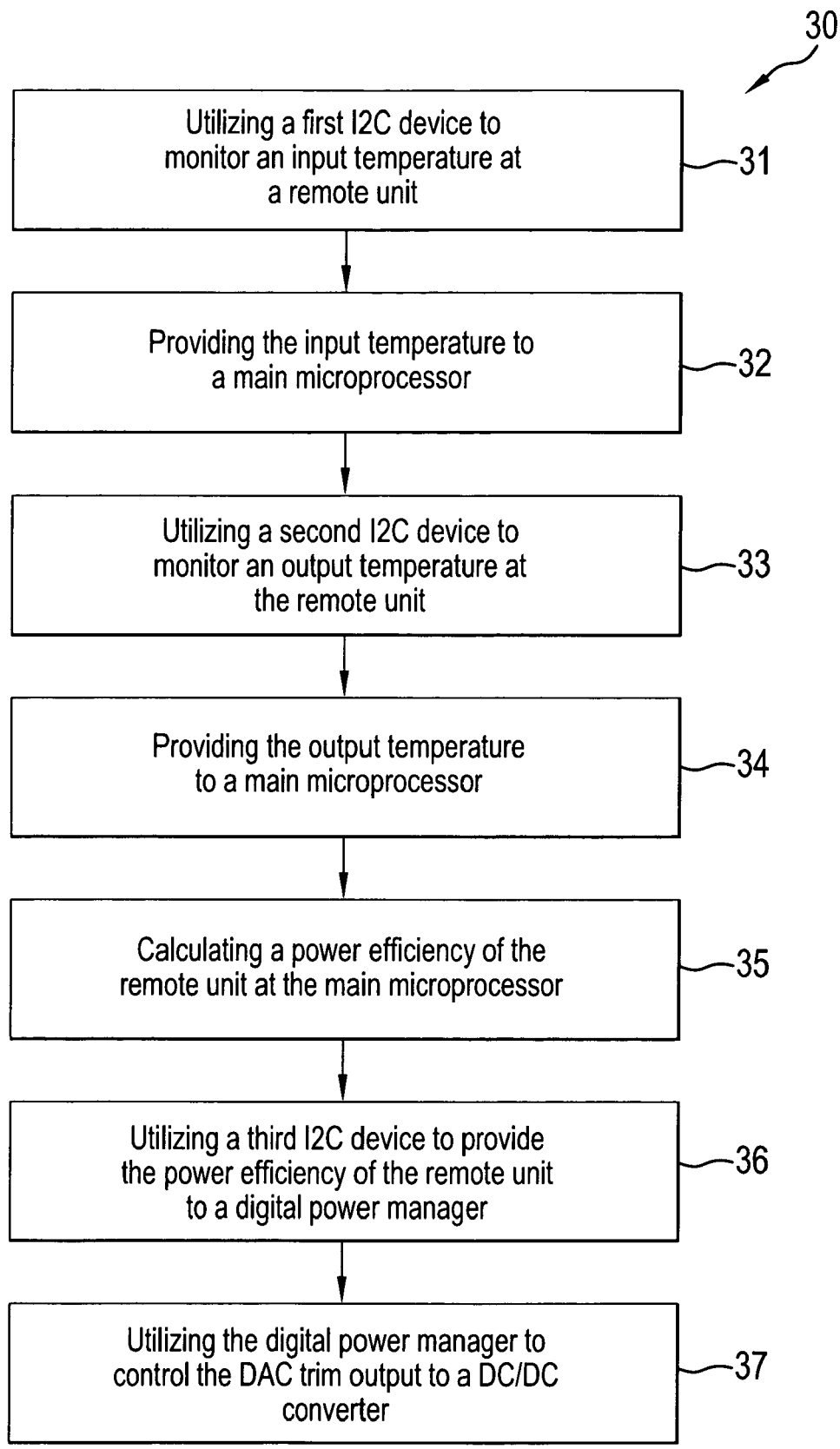
FIG. 3 depicts an alternative method for providing end-to-end power efficiency in a remote unit (SEM).

FIG. 3 depicts an alternative method for providing end-to-end power efficiency in a remote unit (SEM). This method of providing end-to-end efficiency in a remote unit 30 involves an operation 31 for utilizing a first I2C device to monitor temperature at the input to the remote unit. Operation 32 involves providing the input temperature to a main microprocessor. Operation 33 involves utilizing a second I2C device to monitor the temperature at the output to the remote unit. Operation 34 involves providing the output temperature to the main microprocessor. Operation 35 involves calculating a power efficiency of the remote unit at the main microprocessor. Operation 36 involves utilizing a third I2C device to provide the power efficiency of the remote unit to a digital power manager. Operation 37 involves utilizing the digital power manager to control the DAC trim output to a DC/DC converter. The DAC trim output to the DC/DC converter allows various voltage outputs from the DC/DC converter to be tested to find the optimal one for creating the most power efficient remote unit given the current temperature conditions.

It is contemplated that the method described herein can be implemented as software, including a computer-readable medium having program instructions executing on a computer, hardware, firmware, or a combination thereof. The method described herein also may be implemented in various combinations on hardware and/or software.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A device for optimizing power efficiency in a telecommunications system comprising:
    (a) a network feed monitor capable of being connected to an input cable;
    (b) a DC/DC converter connected to the network feed monitor and a digital power manager;
    (c) a BUS feed monitor connected to the DC/DC converter;
    (d) an active load connected to the BUS feed monitor;
    (e) a first communication protocol device connected to the network feed monitor and a main microprocessor;
    (f) a second communication protocol device connected to the BUS feed monitor, the active load and the main microprocessor; and
    (g) a third communication protocol device connected to the digital power manager and the main microprocessor.

2. The device of claim 1 wherein the first communication protocol device, the second communication protocol device and the third communication protocol device are I2C devices.

3. The device of claim 2 wherein the I2C devices use optoisolation.

4. The device of claim 1 wherein the device is a sealed expansion module located remotely from an input power source.

5. The device of claim 1 wherein the first communication protocol device is capable of being used to monitor input current and input voltage to the network feed monitor.

6. The device of claim 1 wherein the first communication protocol device is capable of being used to monitor input temperature at the network feed monitor.

7. The device of claim 1 wherein the second communication protocol device is capable of being used to monitor output current and output voltage from the BUS feed monitor and the active load.

8. The device of claim 1 wherein the second communication protocol device is capable of being used to monitor temperature at the bus feed monitor and the active load.

9. The device of claim 1 wherein the input cable is a pair of Ring/Tip pairs.

10. A device for optimizing power efficiency in a telecommunications system comprising:
    (a) an input monitor capable of being connected to an input cable;
    (b) a DC/DC converter connected to the input monitor and a digital power manager;
    (c) an output monitor connected to the DC/DC converter;
    (d) a first communication protocol device connected to the input monitor and a main microprocessor;
    (e) a second communication protocol device connected to the output monitor and the main microprocessor; and
    (f) a third communication protocol device connected to the digital power manager and the main microprocessor.

11. The device as recited in claim 10 wherein the output monitor is connected to an active load connector configured to receive an active load.

12. The device as recited in claim 11 wherein the output monitor is a BUS feed monitor.

13. The device as recited in claim 11 wherein the second communication protocol device is connected to the active load connector.

14. The device of claim 10 wherein the second communication protocol device is configured to monitor temperature at the output monitor.

15. The device of claim 10 wherein the first communication protocol device, the second communication protocol device and the third communication protocol device are I2C devices that use optoisolation.

* * * * *